A. MERCKENS.
MILL.
APPLICATION FILED DEC. 15, 1910.
1,000,745.
Patented Aug. 15, 1911.
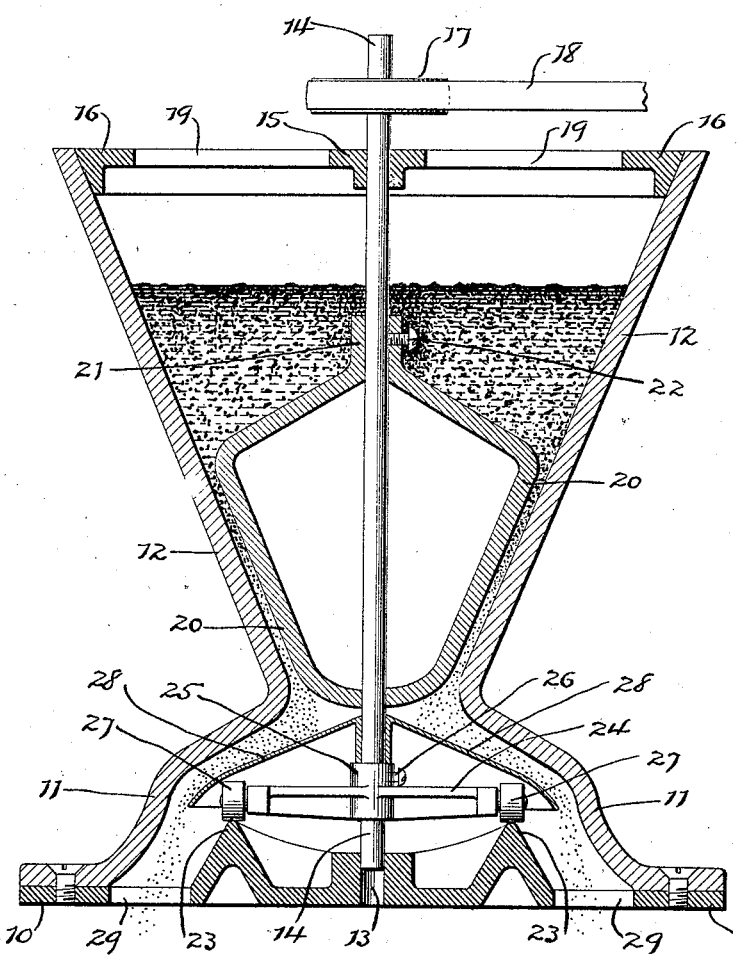
Witnesses:
August Merckens, Inventor.
By Junius Pendleton Wilson, Attorney.

UNITED STATES PATENT OFFICE.

AUGUST MERCKENS, OF NEW YORK, N. Y.

MILL.

1,000,745.

Specification of Letters Patent.    Patented Aug. 15, 1911.

Application filed December 15, 1910. Serial No. 597,546.

*To all whom it may concern:*

Be it known that I, AUGUST MERCKENS, a citizen of the United States, residing in the borough of Brooklyn, county of Kings, city and State of New York, have invented an Improvement in Mills, of which the following is a specification.

My invention relates to mills and particularly to mills for grinding chocolate and similar materials, although the use to which my improved mill may be put is not to be understood as being limited to grinding chocolate, as it is equally adapted for grinding any mineral or fiber substances in liquids or oils, such for example as paints or inks.

The principal object of my invention is the provision of a mill in which a simultaneous feeding and pulverizing of the material to be ground is effected by the same members of the apparatus, whereby the time employed in grinding is materially shortened without decreasing the efficiency of the mill as a grinder.

In carrying out my invention, I preferably employ a base, a container to receive the material to be ground, a grinder within the container, means whereby the grinder is revolved or turned within the container, and means whereby in the turning of the grinder, the same is raised and lowered to alternately recede or move away from and then back into contact with the walls of the container, as will be hereinafter more particularly described.

The drawing illustrates a central vertical cross-section of a mill comprising my present invention.

Referring to the drawing, my improved mill preferably comprises a base or foundation 10 upon which is mounted a container having a conical wall 12 mounted upon the container base 11, which latter is secured in any desired manner to the base or foundation 10. Connected to or made integral with the base 11 is a bearing 13 adapted to receive the lower end of the shaft or spindle 14, the upper portion of which passes through and is journaled in a bearing 15 made in a cross-piece or brace 16 fitting within the upper portion of the conical walls 12 of the container.

The upper end of the shaft 14 is provided with a pulley 17, by which as will be understood, by means of a belt 18 or otherwise, the shaft 14 may be revolved from any suitable or desired source of power, the cross-piece or brace 16 being provided with openings 19, through which the material to be ground may be passed to the interior of the container.

On the shaft 14 and within the conical walls 12 of the container, I employ a grinder 20. As illustrated, this grinder is hollow, is provided with a hub 21 through which the shaft 14 passes, and is connected to the shaft 14 by set screws 22; as will be understood, the grinder 20 may, to have the required weight, be made solid, or the walls thereof be made of any thickness and the same may be secured to the shaft 14 in any manner known to the art. The walls of the grinder 20 however, which come adjacent to the conical walls 12 of the container, are made to taper at the same angle as the walls 12 of the container, so that when the grinder is lowered, the surfaces of these inclined walls of the grinder coincide with the inner surfaces of the walls 12 of the container. Surrounding the bearing 13, the base or foundation 10 is provided with a rib or flange 23, having oppositely disposed raised and depressed portions.

Fixed on the shaft 14 is a cross-arm 24 extending from opposite sides of a hub 25, the same being secured to the shaft 14 by a set screw 26 or otherwise. At the extremities of the cross-arm 24, there are axles upon which rollers 27 are mounted, the rollers 27 being adapted to run on the edge of the rib 23 when the shaft 14 is turned, so that alternately the shaft 14 and grinder 20 are raised and lowered to permit the material to be ground to be more readily fed to and through the space between the adjacent surfaces of the grinder and the conical walls 12 of the container, and to return the grinder to its lowered position, so that these adjacent surfaces would come into contact were it not for the intervening material which through the turning of the grinder, effects the grinding. Also secured on the shaft 14 below the grinder 20 and above the cross-arm 24 and rollers 27, is a scraper-shield 28, which not only keeps the material as ground from accumulating on the inner walls of the container, but also serves to prevent the material from coming into contact with the rollers 27 and rib 23, and furthermore permits the ground material to pass from the mill by directing its course through the annular space 29 in the base or foundation 10.

I claim as my invention:

1. A mill comprising a base, a container, a grinder, means for turning the grinder within the container, and means actuated by the turning of the grinder, to cause the latter to move entirely away from and out of contact with the walls of the container and to return in like manner into contact with the said walls.

2. A mill comprising a base, a container having conical walls, a grinder having inclined walls, a shaft passing through the container and upon which the grinder is mounted, bearings for the shaft, means for turning the shaft to revolve the grinder, and means actuated by the turning of the shaft to cause the shaft and grinder to move longitudinally so that the grinder is moved entirely away from the walls of the container and returned to position so that the entire grinding surface of the grinder is in contact with the walls of the container.

3. A mill comprising a base, a container having conical walls, a grinder having inclined walls, a shaft passing through the container and upon which the said grinder is mounted, bearings for the shaft, means whereby the shaft is turned to revolve the grinder, a rib connected to the said base and having alternately raised and depressed portions, and means connected with the shaft and coöperating with the said raised and depressed portions of the rib to cause the said shaft to be raised and lowered when turned so as to move the said grinder away from and to return the same into contact with the conical walls of the container.

4. A mill comprising a base, a container having conical walls, a grinder having inclined walls, a shaft passing through the container and upon which the said grinder is mounted, bearings for the shaft, means whereby the shaft is turned to revolve the grinder, a rib connected to the said base and having alternately raised and depressed portions, a cross-arm connected to said shaft, and rollers mounted at the extremities of the said cross-arm and adapted to run on the alternately raised and depressed portions of the edge of the rib to raise and lower the said shaft when the same is revolved, whereby the said grinder is alternately moved away from and returned into contact with the conical walls of said container.

Signed by me this 10th day of December, 1910.

AUGUST MERCKENS.

Witnesses:
WM. J. McDERMOTT,
WM. K. JERMY.